United States Patent [19]

Bannister

[11] Patent Number: 5,108,771
[45] Date of Patent: Apr. 28, 1992

[54] PROCESS AND APPARATUS FOR REMOVING FLESH FROM COOKED BAKED POTATOES

[76] Inventor: Robert M. Bannister, Burrow House, Langtoft, Driffield, Humberside, United Kingdom

[21] Appl. No.: 438,459
[22] PCT Filed: Jun. 30, 1988
[86] PCT No.: PCT/GB88/00516
 § 371 Date: Jan. 3, 1990
 § 102(e) Date: Jan. 3, 1990
[87] PCT Pub. No.: WO89/00096
 PCT Pub. Date: Jan. 12, 1989

[30] Foreign Application Priority Data
 Jul. 4, 1987 [GB] United Kingdom ............ 8715783

[51] Int. Cl.⁵ ............ A23L 1/216; A23N 7/00; A23P 1/00
[52] U.S. Cl. ............ 426/482; 99/567; 99/584; 99/588; 426/481
[58] Field of Search ............ 99/501, 504-507, 99/537-541, 567, 584, 587, 593, 588-591; 436/481, 482, 441, 637, 514, 808

[56] References Cited

U.S. PATENT DOCUMENTS

| | | | |
|---|---|---|---|
| 3,320,988 | 5/1967 | Armstrong et al. | 99/584 |
| 3,974,722 | 8/1976 | Florian | 99/455 X |
| 4,526,093 | 7/1985 | Fogerson | 99/537 X |
| 4,770,092 | 9/1988 | Curtis et al. | 99/588 X |

FOREIGN PATENT DOCUMENTS

| | | |
|---|---|---|
| 43142 | 7/1981 | European Pat. Off. |
| 152218 | 1/1985 | European Pat. Off. |
| 145453 | 6/1985 | European Pat. Off. |
| 388933 | 3/1933 | United Kingdom |
| 756361 | 9/1956 | United Kingdom |
| 1228915 | 4/1971 | United Kingdom |
| 1500250 | 12/1976 | United Kingdom |
| 1509721 | 5/1978 | United Kingdom |
| 1509722 | 5/1978 | United Kingdom |
| 1568910 | 6/1980 | United Kingdom |
| 1586848 | 3/1981 | United Kingdom |
| 2059752 | 4/1981 | United Kingdom |
| 2100588 | 1/1983 | United Kingdom |
| 2120523 | 12/1983 | United Kingdom |
| 2157539 | 10/1985 | United Kingdom |
| 2173090 | 10/1986 | United Kingdom |
| 2191388 | 12/1987 | United Kingdom |

*Primary Examiner*—Timothy F. Simone
*Attorney, Agent, or Firm*—Wegner, Cantor, Mueller & Player

[57] ABSTRACT

Apparatus is described for removing flesh from a cooked baked potato half supported in a pocket on a indexed conveyor. The apparatus comprises a plunger carrying a convex-shaped dicer head which is automatically reciprocated by a predetermined stroke in synchronism with the passage of a potato thereunder. The dicer head comprises a plurality of apertures or channels through or into which potato flesh passes as the dicer head is depressed into the potato half. The flesh is either immediately transferred to a conveyor or passes to a conveyor after accumulating above the dicer head. The potato is held down as the plunger is withdrawn by a potato keeper which keeper is carried on the plunger mounted to slide with respect to the dicer head and resiliently biassed to stay in position on the potato as the dicer head is withdrawn. The withdrawal of the dicer head may be assisted by gas jets activated in synchronism with the withdrawal of the dicer head.

20 Claims, 2 Drawing Sheets

U.S. Patent     Apr. 28, 1992     Sheet 1 of 2     5,108,771
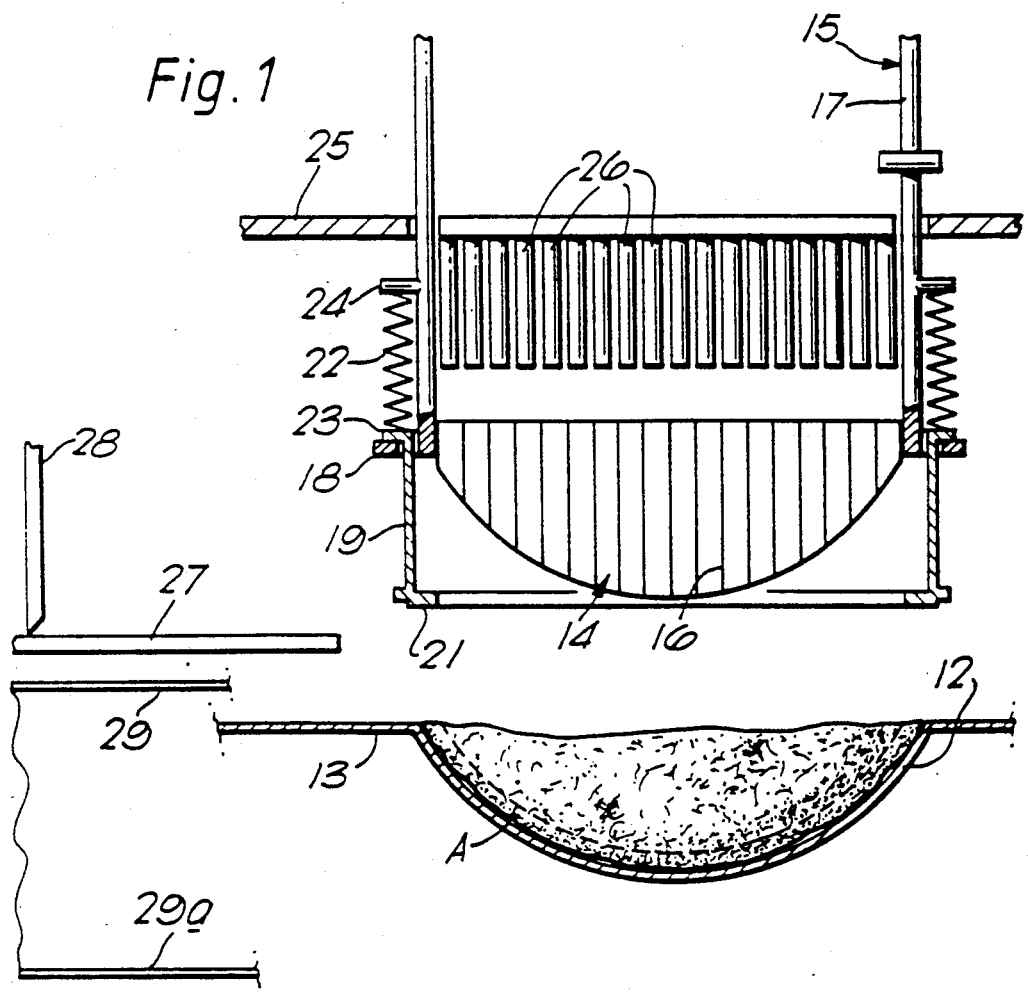
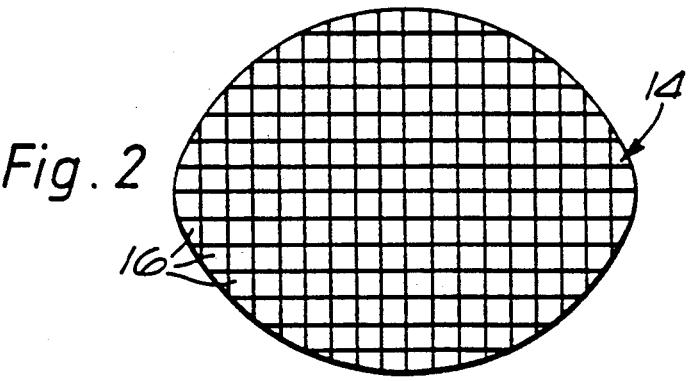

PROCESS AND APPARATUS FOR REMOVING FLESH FROM COOKED BAKED POTATOES

The present invention relates to a process and apparatus for use in the preparation of stuffed baked potatos and particularly to the part of the process in which the flesh is removed from the cooked baked potato. This flesh may be subsequently mixed with other ingredients before being replaced in the empty potato skins if required Currently much of the operation of removing flesh is done by hand. Machines do exist for removing the flesh automatically, for example by loosening the flesh and inverting the potato, but they either suffer from problems stemming from the stickiness caused by the starch in the potato or they are mechanically complex.

It is the object of the present invention to provide a simpler and more effective machine than any I am currently aware of.

STATEMENT OF INVENTION

According to the present invention there is provided an apparatus for removing flesh from a cooked baked potato half, characterised in that the apparatus comprises a plunger carrying a convex-shaped dicer head and a device for automatically lowering and raising the dicer head by a predetermined stroke in synchronism with passage of a potato thereunder, the dicer head comprising a plurality of channels and being adapted to move through the cooked potato flesh on its downward stroke and lift flesh from the skin on its upward stroke.

The channels may be deep in which case the flesh adheres to the inside thereof and remains in the channels until pushed out. Where the channels are short or just apertures the flesh passes through the channels and collects above the dicer head, optionally in a container. Preferably the apparatus includes means for transferring the flesh to a flesh-removal conveyor.

The present invention includes a method of automatically removing flesh from a series of cooked-potato halves on a conveyor adapted to carry the halves in turn to and from a flesh removal station; at the flesh removal station and using apparatus described above, plunging a dicer head into the potato half and withdrawing the head with the flesh thereon; and transferring the flesh to a second conveyor.

Advantageously the apparatus includes a plurality of plungers arranged transversely across the passage of the potato halves and the method includes the step of advancing a plurality of potatos simultaneously to the flesh removal station.

The dicer head may comprise a grid of substantially vertical channels in which case the apparatus may include a set of pusher rods adapted to push the flesh out of the channels for transfer to the conveyor. These rods may be plastics material or corrosion resistant metal. Polycarbonate rods would be suitable.

Where the channels are short and the dicer head collects the flesh on its upper surface the flesh can be transferred to the second conveyor without clearing the channels. In some embodiments flesh may be allowed to accumulate above the dicer head before being transferred to the second conveyor.

BRIEF DESCRIPTION OF DRAWINGS

The invention will now be described, by way of example with reference to the accompanying drawings in which:

FIG. 1 is a diagrammatic view of one embodiment of the invention,

FIG. 2 is an underneath view of the dicer head of FIG. 1 and,

SPECIFIC DESCRIPTION

Figure 3:
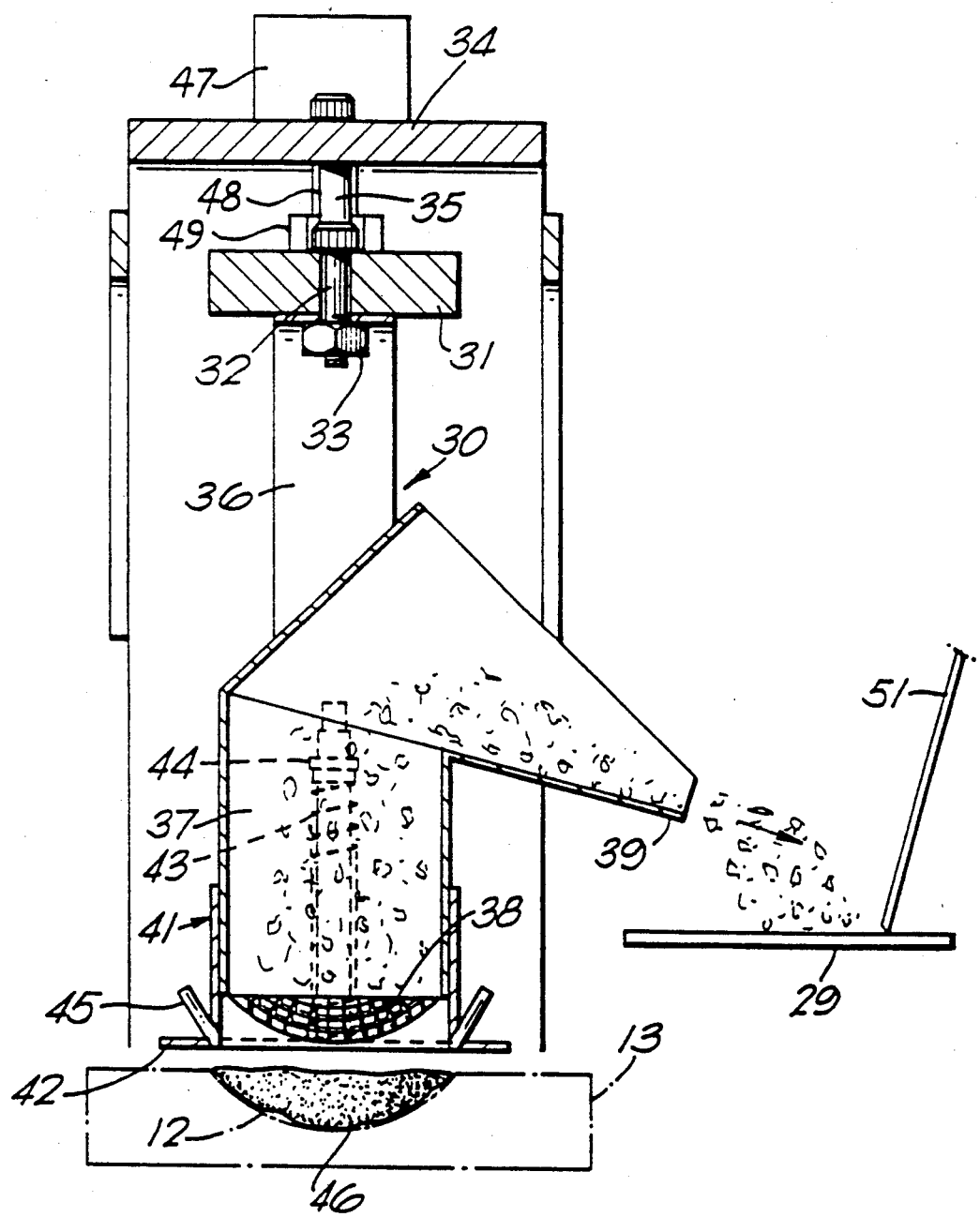
FIG. 3 is a side view of a second embodiment of the invention.

Cooked baked potatoes are cut in half manually or automatically and placed in pockets 12 in an indexed conveyor belt 13. The skins of the potato remain in the pockets for the duration of the process. Most of the flesh is removed at a flesh removal station and conveyed to a station at which it is mixed with other ingredients. The potato skins are subsequently refilled with the potato-ingredient mix before packaging. Each pocket 12 in the belt is a plastics material or metal mould shaped to be an optimum support for the grade of potato that is to be processed. The apparatus that is described hereafter is located at the flesh removal station at which the conveyor stops for long enough for the flesh to be removed.

The flesh removal apparatus comprises a dicer head 14 disposed at the lower end of a plunger 15 which is pneumatially or hydraulically operated to move with a substantially vertical motion to lower the head 14 into the potato half and raise the head 14 with the flesh. The dicer head 14 comprises a grid of channels 16 of a depth substantially equal to the depth of a largest potato half to be processed. In practice the lower position of the head will be that marked by the dashed lines A in FIG. 1. By leaving a small layer of flesh at the bottom of the potato half the risk of breaking the potato skin is reduced. The lower end of the dicer is convex and shaped substantially to conform with the shape of the mould, which in this case is substantially oval, but may be circular. The channels 16 may be of any convenient shape, such as square, hexagonal, or rhomboid for example. The only restriction on the shape and dimensions of the channels is that potato once in the channels will stay there until pushed away or otherwise removed. For a square grid a channel width of 10–12 mm has been found satisfactory.

The head 14 is rigidly fixed to arms 17 of the plunger 15 which arms are reciprocated up and down by a ram (not shown). At the lower end the arms support a bracket 18 which carries a ring 19 slidably mounted therethrough and of a shape conforming to the top of the pocket 12. The lower end of the ring is in the form of a foot 21 which sits round the edge of the pocket and locates the head in the pocket. The ring 19 also acts as a potato keeper as the foot holds the potato in the pocket during the return stroke of the plunger. The ring 19 is spring biassed to a lower position by a compression spring 22 disposed between a ridge 23 on the upper end of the ring 19 and an abutment surface 24 on the upper end of the ring 19 and an abutment surface 24 on the ram arms 17 The arms 17 pass through a fixed plate 25 which carries a set of rods 26 the dimensions and location of which conform to the grid of the dicer head. Each rod is located directly above one of the channels 16. On its downward journey the plunger takes the dicer head to a predetermined lower position A the head passing through the upper part of the baked potato and collecting potato flesh in the channels On its upward journey the dicer head 14 moves up to the fixed plate 25 so that the rods slot into their respective channels discharging the potato as described hereafter.

A flesh collecting plate 27 is positioned vertically between the potato pocket 12 and the upper position of the dicer head 14. The plate 27 is moveable horizontally between a position under the dicer head 14 and a position out of the path of the dicer head As the dicer head carrying the potato flesh moves upwardly, the plate moves to its position under the head 14.

As the head rises further the rods 26 push the flesh out of the channels 16 to collect on the plate 27. The plate 27 is then withdrawn sideways past a fixed scraper blade 28 which scrapes the potato off the plate 27 and onto a second conveyor belt 29 under the plate 27. The second belt 29 is an endless belt, the return of which is illustrated at 29a, which travels substantially perpendicularly to the belt 13. The flesh is carried on the second belt 29 to the next stage of the process.

The operation can be extended by providing a plurality of heads arranged transversely to a wider belt 13, the belt 13 having an equivalent number of pockets 12 arranged in rows. For example four potato halves could be simultaneously presented to the flesh removal station if the belt 13 was four pockets wide and there were four plungers 15. The size of the head preferably relates to the grade of potato being processed. With the multiple arrangement described above it would be possible to treat different grade potatoes simulataneously by having different pocket and head sizes across the row.

The action of the dicer head is doubly useful. Not only does it remove the flesh but it simultanously cuts it up. This is particularly useful as it is preferably not to beat the potato too much as it becomes less palatable.

Although the apparatus described and illustrated has deep channels which hold all the flesh removed from a potato it would be possible to use a dicer head with channels only as deep as the convex shaping—i.e. of mimimum length at the outside and increasing towards the middle in accordance with the shape. Using a head like this the potato would pass through the channels and accumulate above the head on the platform formed by the top of the dicer head. Means would then be provided for removing the potato from the top of the dicer head onto the conveyor.

Although a dicer head with channels is described, any head would suffice which would pass through the potato flesh on a downward stroke and remove potato flesh on an upward stroke without any secondary mechanical action.

The characteristic that enables the potato to be caught by the dicer and held there is not currently fully known. The features that are thought to be relevant are the surface tension between the potato and the dicer head, the size of the channels and the stickiness of cooked potato.

If the conditions are not completely met for the potato always to be held in the dicer head it may be necessary to incorporate a two way compressed air /gas supply. This would be connected to the upper end of the dicer head. It could be operated both as a suction device to hold potato in the head as it is raised and subsequently as a blower to transfer the potato from the head to the conveyor. Rather than a reversing switch it may be preferable to have two separate supplies, one under pressure and one under vacuum and a switch to transfer the action between the two.

It will be appreciated that even where the suction feature is not required, it will still be possible to replace the rods 26 with a pressurised gas supply (not shown).

The apparatus illustrated in FIG. 3 is one plunger 30 of a group of four all vertically reciprocated by a single ram 47,48. For this purpose the plungers 30 are bolted to a cross beam 31 by a bolt 32 and nut 33. The beam 31 is supported on a frame 34 by two arms 35. The motor 47 sits above the beam 34 and the ram arm?extends through the beam 34 and is fixed to the beam 31 by a bolt 49.

The plunger 30 comprises a pair of side brackets 36 which are bolted to the cross beam 31 by two small bolts (not shown) as well as by the bolt 32, and which support a potato flesh container 37. The bottom floor of the container 37 comprises a convex-xhaped dicer head 38 formed in a grid of channels or apertures 16. The shape of the channels 16 is optional. The channels should be sufficient to allow the passage of potato flesh on a downward plunger stroke and small enough so that the dicer head carries the flesh on the upward plunger stroke. The top of the container includes a sidewardly directed chute 39 which forms the outlet of the container, the mouth of which chute is oval in section and opens above a flesh removal conveyor 29.

A potato keeper 41 includes an oval flange 42, which operates as the ring foot 21, the flange being positioned and dimensioned to hold a potato in place in the conveyor pocket 12 at the flesh removal station while the operation is performed The potato keeper 41 is resiliently attached to the container 37 by two compression springs 43 mounted between the top of the flange 42 and respective brackets 44 on the container 37. The potato keeper is slideably fitted outside the container 37 and resiliently biassed to the lowest position of the flange 42.

Two gas nozzles 45 angled at 60° to the horizontal open into the flesh removal station through the corner of the potato keeper 41 on opposite sides thereof. Gas is applied to these nozzles 45 to create gas jets as the plunger begins to rise. The application of gas at this juncture helps the plunger to overcome any resistance that might be caused by potato flesh stickiness.

In operation the indexed conveyor 13 carrying the pockets 12 and the potato halves 46 moves a potato to the flesh removal station under the plunger 30. Simultaneously the plunger 30 carrying the potato keeper 41 is lowered until the keeper engages the top of the conveyor around the potato half 46. The plunger continues to lower against the resilient bias of the spring 43 until the dicer head 38 has cut through the potato flesh. As the plunger rises it carries the potato flesh on top of the dicer head in the container 37. The potato keeper stays in position over the potato until the maximum extension of the spring 43 has been reached and thereafter rises with the plunger to allow the conveyor to move on. As the plunger starts to rise gas is automatically supplied to the nozzles 45 in a brief jet.

As the second and subsequent potatos are emptied the flesh accumulates in the container above the dicer head. When the accumulates flesh is sufficiently high in the container it will reach the chute 39 along which it will be pushed as further potato flesh enters the container 37 via the dicer head channels. Eventually the flesh will leave the mouth of the chute and land on the continuously moving conveyor 29. A baffle 51 may be provided if necessary to ensure that all the potato leaving the chute 39 stays on the conveyor.

In principle the operation of this machine is the same as that described with respect to FIGS. 1 and 2. Only the actual plunger is modified to do away with the need to remove potato flesh from the plunger after each operation.

I claim:

1. Apparatus for removing flesh from a cooked potato-half, the apparatus comprising a potato-holding pocket for holding a cooked potato half at a flesh removal station, a plunger carrying a convex-shaped flesh removal head and means for plunging the head into the cooked potato half at the flesh removal station and withdrawing the head to lift the potato flesh, the head having a plurality of openings allowing the passage of potato flesh therethrough as the head is plunged into the potato half, wherein the apparatus includes a potato keeper mounted on the plunger, said keeper comprising a means for holding the potato half in the pocket during flesh removal.

2. Apparatus according to claim 1, wherein the potato keeper is resiliently biassed toward the pocket at the flesh removal station.

3. Apparatus according to claim 1, wherein said openings are arranged in a grid.

4. Apparatus according to claim 1, wherein said openings inlet into respective channels and the channels are dimensioned so that the flesh can adhere therein, the apparatus including means to collect the flesh from the channels.

5. Apparatus according to claim 4, wherein said means to collect the flesh from the channels comprises cooperating rods mounted above said head and adapted to pass into the channels on withdrawal of the plunger.

6. Apparatus according to claim 5, including gas jet nozzles mounted on the plunger and aimed toward the potato pocket.

7. Apparatus according to claim 6, wherein said nozzles are mounted on the potato keeper.

8. Apparatus for removing flesh from a cooked potato half, the apparatus comprising a set of potato-holding pockets each for carrying a cooked potato half to a flesh removal station, a plunger carrying a convex-shaped dicer head and means for plunging the head into the cooked potato half at the flesh removal station and withdrawing it from the potato half to lift the potato flesh, the head having a plurality of openings, wherein the apparatus includes means for reciprocating the plunger in synchronism with passage of the potato pockets, and keeper means mounted on the plunger for holding the potato half in the pocket during the withdrawal of the head.

9. Apparatus according to claim 8, wherein the potato keeper is resiliently biassed toward the pocket at the flesh removal station.

10. Apparatus according to claim 8, wherein said openings are arranged in a grid.

11. Apparatus according to claim 10, wherein said openings inlet into respective channels and the channels are dimensioned so that the flesh can adhere therein, the apparatus including means to collect the flesh from the channels.

12. Apparatus according to claim 11, wherein said means to collect the flesh from the channels comprises cooperating rods mounted above the head and adapted to pass into the channels on withdrawal of the plunger.

13. Apparatus according to claim 8, including gas jet nozzles on the plunger aimed toward the potato pocket.

14. Apparatus according to claim 13, wherein said nozzles are mounted on the potato keeper.

15. Apparatus according to claim 10, wherein the openings are in the form of apertures in the dicer head which allow passage of potato flesh through the dicer head on plunging of the head into the potato.

16. Apparatus according to claim 15, wherein the apparatus includes a container in the plunger disposed above the head in which the potato flesh can accumulate, the container having an outlet through which potato flesh can be discharged.

17. A method of automatically removing flesh from a series of cooked potato halves comprising providing a set of potato-holding pockets on a conveyor, placing a cooked potato half in each pocket, advancing the pockets in sequence to a flesh removal station, holding the potato in the pocket at the flesh removal station while plunging a convex-shaped head into the potato half to cut the potato flesh and withdrawing the head with the flesh thereon, wherein the step of holding the potato in the pocket is carried out using a potato keeper mounted on the plunger.

18. A method according to claim 17, further comprising the step of reciprocating the plunger to plunge and withdraw the flesh removal head.

19. A method according to claim 18, further comprising the step of storing the flesh in the plunger before transferring the potato flesh from the plunger.

20. A method according to claim 17, further comprising the step of applying gas under pressure to release the keeper from the potato.

* * * * *